United States Patent Office 3,775,450
Patented Nov. 27, 1973

3,775,450
PROCESS FOR PURIFICATION OF
CARBOXYLIC ACIDS
Paul H. Washecheck, Ponca City, Okla., Owen Portwood, Jr., Janesville, Wis., and Charles M. Starks, Ponca City, Okla., assignors to Continental Oil Company, Ponca City, Okla.
No Drawing. Filed Dec. 21, 1971, Ser. No. 210,587
Int. Cl. C09f 5/10
U.S. Cl. 260—419
6 Claims

ABSTRACT OF THE DISCLOSURE

Hydrogenation of carboxylic acids produced by nitric acid oxidation prior to distillation improves overall acid quality.

This invention relates to a method for improving quality of saturated aliphatic and cycloaliphatic carboxylic acids produced by nitric acid oxidation of the carboxylic acid precursors.

There are various organic carboxylic acids known which are normally prepared by hydrolysis of various fats and oils, such as tallow or coconut oil, or by synthetic processes involving oxidation of various paraffins. The carboxylic acids produced by these methods are generally purified after isolation, by conventional distillation techniques. However, even after distillation some further improvement in the quality of the carboxylic acids is oftentimes desired. Among the various techniques for further improving the acid quality, the most common technique involves post-hydrogenation of the distilled carboxylic acid which normally improves the color and decreases the amount of unsaturation present in the acid product.

However, in the case of saturated aliphatic and cycloaliphatic carboxylic acids produced by nitric acid oxidation of the acid precursors such as 1-olefins and alcohols, it has been found that post-hydrogenation of the distilled carboxylic acid products does not consistently improve the acid quality and in some cases even results in deterioration of the quality.

In accordance with this invention, there is provided a method for improving the quality of saturated aliphatic and cycloaliphatic carboxylic acids derived by nitric acid oxidation which, briefly described, comprises hydrogenating said saturated aliphatic and cycloaliphatic carboxylic acids as isolated from the oxidation reaction and prior to any purification by distillation.

The carboxylic acids which may be improved in quality in accordance with the method of this invention include saturated aliphatic and cycloaliphatic monocarboxylic acids produced by a conventional oxidation technique wherein the oxidizing agent is an oxide of nitrogen. By oxide of nitrogen it is intended to mean $NO_2$, $N_2O_4$, nitric acid, and the like which function in a similar manner to oxidize aliphatic and cycloaliphatic compounds, such as 1-olefins and alcohols, to acids. These oxidizing techniques are well known in the art as evidenced in part by U.S. Pats. 2,811,545; 2,298,387 and 1,921,101. Preferably the saturated aliphatic carboxylic acids are those having 3 to 30 carbon atoms, either straight or branch chain, and the saturated cycloaliphatic acids are those haivng 4 to 8 carbon atoms. Examples of some acids included in these categories are propionic acid, butyric acid, isobutyric acid, 2-methyl-pentanoic acid, hexanoic acid, 2-ethylhexanoic acid, heptanoic acid, 4-methyl-heptanoic acid, caprylic acid, lauric acid, stearic acid, palmitic acid, 2-ethyl-n-caprylic acid, arachic acid, behenic acid, nonadecanoic acid, cyclobutane monocarboxylic acid, cyclopropane monocarboxylic acid, cyclohexane monocarboxylic acid, and the like.

In the method of this invention, the above described acid or mixture of such acids, as isolated from the oxidation reaction and prior to any purifying distillation step, is subjected to conventional hydrogenation employing hydrogen and hydrogenation catalyst such as paladium, platinum, nickel, and the like. The pressure and temperature under which the hydrogenation is carried out is not critical to the invention provided that such high temperatures as would lead to degradation of the reactants or reaction products should be avoided. In general, higher reaction pressures and temperatures will lead to increased reaction rates. Some typical conditions under which the hydrogenation reaction may be conducted include a hydrogen pressure in the range of about 100 to about 2000 p.s.i and a temperature in the range from about room temperature (i.e. 15° C.) up to about 300° C. Hydrogenation should be continued until completion, that is until further hydrogen take-up in the reaction mixture has essentially ceased.

The hydrogenated reaction product is then distilled under suitable conditions to recover the purified carboxylic acid product having improved quality. In general, distillation should not exceed about 250° C. to avoid decarboxylation.

The following examples will serve to further illustrate the invention and the unique improvements obtained therewith as compared with prior art techniques.

EXAMPLE 1

This example demonstrates the lack of overall quality of monocarboxylic acids prepared by nitric acid oxidation which have been purified solely by distillation.

A mixture of saturated aliphatic $C_6$, $C_8$ and $C_{10}$ monohydric alcohols were oxidized using nitric acid to a reaction product containing mixed $C_5$–$C_{10}$ saturated aliphatic monocarboxylic acids. The mixed acids were isolated by paraffin extraction of the crude reaction mixture. The resulting paraffin solution was then backwashed with water to remove dissolved and entrained nitrogen oxides and nitric acid. The mixed acids product was then isolated by distilling off the paraffin. The product was purified by distillation with several product cuts being made for quality analysis. Cut "A" was made at 50 mm. Hg and an overhead temperature range of 261–266° F. (22.2% $C_5$ acid and 77.8% $C_6$ acid); Cut "B" was made at 50 mm. Hg and an overhead temperature range of 267–268° F. (3.8% $C_5$ acid and 97% $C_6$ acid); Cut "C" was made at 50 mm. Hg and an overhead temperature of 269° F. (0.5% $C_5$ acid, 98.2% $C_6$ acid and 1.3% $C_7$ acid); Cut "D" was made at 10 mm. Hg and an overhead temperature range of 225–253° F. (some heat-up due to reduction pressure included) (32.2% $C_6$ acid, 41.7% $C_7$ acid and 26.1% $C_8$ acid); and Cut "E" was made at 10 mm. Hg and an overhead temperature range of 300–304° F. (6.1% $C_9$ acid and 93.6% $C_{10}$ acid). Each cut was then analyzed for quality in terms of p.p.m. nitrogen, initial color, heat stability and acid heat stability. Initial color was determined in accordance with American Oil Chemical Society Standard Test Td–3a–64 and generally involved placing a sample of the product to be analyzed in a standard cell of 2.5 cm. thickness, passing a light beam through the cell and measuring the percent light transmitted at 440 mu (yellow) and at 550 mu (red). Heat stability was determined by heating a sample of the product to be analyzed for two hours at 205° C. and then measuring the percent light transmitted by the above test Td–3a–64. The acid heat stability was determined by mixing a 1 gm. sample of the product to be analyzed with 50 gm. concentrated (96%) sulfuric acid, heating the mixture for 15 minutes at 100° C. and then determining the color of the sample on the Gardner scale.

The data obtained from the above tests is tabulated in Table 1.

TABLE 1
[Distillation only]

| Cut | N (p.p.m.) | Initial color 440 mµ | Initial color 550 mµ | Heat stability 440 mµ | Heat stability 550 mµ | Acid heat stability |
| --- | --- | --- | --- | --- | --- | --- |
| A | 250 | 85 | 87 | 24 | 68 | 1 |
| B | 120 | 99 | 100 | 73 | 92 | 1 |
| C | 60 | 95 | 98 | 75 | 96 | 1 |
| D |  | 98 | 99 | 87 | 99 | 1 |
| E | 110 | 85 | 89 | 6 | 45 | 3 |

From the above data it can be seen that of the total analyzed product of monocarboxylic acids, both Cuts "A" and "E" were clearly of inferior quality, particularly initial color. Thus, while distillation alone produces some acid cuts of good quality, there also results some acid cuts of relatively poor quality.

EXAMPLE 2

This example demonstrates the lack of overall quality of monocarboxylic acids prepared by nitric acid oxidation which have been purified by distillation followed by post-hydrogenation.

A mixture of $C_6$, $C_8$, and $C_{10}$ saturated aliphatic monohydric alcohols were oxidized to a reaction product containing a mixture of $C_5$–$C_{10}$ saturated aliphatic monocarboxylic acids using a conventional nitric acid oxidation technique. The mixed acids were isolated by paraffin extraction of the crude reaction mixture. The resulting paraffin solution was then backwashed with water to remove dissolved and entrained nitrogen oxides and nitric acid. The mixed acids product was then isolated by distilling off the paraffin. The product was first distilled with the following product cuts being taken for quality analysis: Cut "A" was made at 50 mm. Hg at an overhead temperature range of 261–266° F. (22.2% $C_5$ acid and 77.8% $C_6$ acid) and Cut "B" was made at 50 mm. Hg at an overhead temperature of 269° F. (0.5% $C_5$ acid, 98.2% $C_6$ acid and 1.3% $C_7$ acid).

Each product cut was then separately hydrogenated by charging a sample of the cut to a 5-gallon autoclave containing a conventional hydrogenation catalyst (5% Pd on charcoal). The autoclave was then purged with nitrogen and pressured with 800 p.s.i. $H_2$. The reaction mixture in the autoclave was agitated for about three hours at room temperature during which time the hydrogen take-up in the reaction mixture reached zero, indicating substantially complete hydrogenation. Each hydrogenated product cut was then analyzed for quality in the manner described in Example 1 with the results indicated in the following table.

TABLE 2
[Distillation and post-hydrogenation]

| Cut | Initial color 440 mµ | Initial color 550 mµ | Heat stability 440 mµ | Heat stability 550 mµ | Acid heat stability |
| --- | --- | --- | --- | --- | --- |
| A | 69 | 97 | 25 | 66 | 1 |
| B | 98 | 100 | 73 | 97 | 1 |

As is apparent from the above data, the quality of product Cut "A" was clearly inferior, particularly initial color, while product Cut "B" was of good quality. It should also be noted that Cuts "A" and "B" of Table 2 correspond to Cuts "A" and "C" of Table 1 after being subjected to post-hydrogenation and it is apparent from a comparison of the data that the post-hydrogenation treatment actually impaired the quality of Cut "A" and did not result in any overall improvement in the quality of Cut "B" ("C"). It is obvious from this data that a post-hydrogenation technique does not provide for overall quality improvement in the carboxylic acid products.

EXAMPLE 3

This example demonstrates the overall quality of monocarboxylic acids prepared by nitric acid oxidation which have been purified by pre-hydrogenation followed by distillation in accordance with the method of this invention.

A mixture of $C_6$, $C_8$ and $C_{10}$ saturated aliphatic monohydric alcohols were oxidized by conventional nitric acid oxidation techniques to a reaction product containing $C_5$–$C_{10}$ saturated aliphatic monocarboxylic acids. The mixed acids were isolated by paraffin extraction of the crude reaction mixture. The resulting paraffin solution was then backwashed with water to remove dissolved and entrained nitrogen oxides and nitric acid. The mixed acids product was then isolated by distilling off the paraffin. This product was then charged to a 5-gallon autoclave containing a conventional hydrogenation catalyst (5% Pd on charcoal) followed by purging of the autoclave with nitrogen. The autoclave was then pressured with 800 p.s.i. $H_2$ and the reaction mixture subjected to agitation for about three hours at room temperature during which time the hydrogen take-up in the reaction mixture reached zero indicating substantially complete hydrogenation.

The hydrogenated reaction product was then distilled with Cut "A" being taken at 50 mm. Hg and an overhead temperature range of 263–264° F. (16.0% $C_5$ acid, 83.7% $C_6$ acid and 0.3% $C_7$ acid); Cut "B" being taken at 50 mm. Hg and an overhead temperature of 266° F. (6.0% $C_5$ acid, 90.8% $C_6$ acid and 3.2% $C_7$ acid); Cut "C" being taken at 50 mm. Hg and an overhead temperature of 267° F. (3.4% $C_5$ acid, 88.5% $C_6$ acid, 6.1% $C_7$ acid and 2.0% $C_8$ acid); Cut "D" being taken at 10 mm. Hg and an overhead temperature range of 256–258° F. (4.7% $C_6$ acid, 6.9% $C_7$ acid, 87.9% $C_8$ acid and 0.5 $C_9$ acid); and Cut "E" being taken at 10 mm. Hg and an overhead temperature range of 300–303° F. (2.4% $C_8$ acid, 6.0% $C_9$ acid and 91.6% $C_{10}$ acid). Each product cut was then analyzed for quality in the manner set forth in Example 1 with the data presented in Table 3.

TABLE 3
[Pre-hydrogenation and distillation]

| Cut | N (p.p.m.) | Initial color 440 mµ | Initial color 550 mµ | Heat stability 440 mµ | Heat stability 550 mµ | Acid heat stability |
| --- | --- | --- | --- | --- | --- | --- |
| A |  | 98 | 99 | 49 | 86 | 1 |
| B | 30 | 95 | 96 | 74 | 93 | 1 |
| C | 50 | 96 | 99 | 84 | 97 | 1 |
| D | 60 | 100 | 100 | 85 | 100 | 1 |
| E | 110 | 96 | 99 | 6 | 48 | 2 |

As is apparent from the above data, all product cuts have good initial color and improved lower nitrogen contents, thus demonstrating that the method of this invention results in general improvement in quality of the overall product, carboxylic acids, relative to the purification techniques of the prior art shown in Examples 1 and 2. Furthermore, while the heat stability of product Cut "A" is somewhat low, it is still improved over similar product cuts of Examples 1 and 2; and likewise, the acid heat stability of product Cut "E" is improved over a similar product cut of Example 1.

EXAMPLE 4

Two samples of 1-octene were converted to saturated aliphatic monocarboxylic acids by conventional nitric acid oxidation. The carboxylic acids in each reaction product were isolated by base extraction. One carboxylic acid product sample was directly distilled without further pre- or post-treatment. The other acid product sample was first hydrogenated (800 p.s.i. $H_2$, 5% Pd on charcoal catalyst) at room temperature and then distilled.

The product sample purified only by distillation analyzed to contain 560 p.p.m. nitrogen while the product sample purified in accordance with this invention analyzed to contain only 60 p.p.m. nitrogen, again demonstrating the improved quality obtained with the method of the invention.

We claim:

1. In a method for purifying at least one carboxylic acid product selected from the group consisting of saturated aliphatic and cycloaliphatic carboxylic acids derived by oxidation of aliphatic and cycloaliphatic precursors selected from the group consisting of 1-olefins and alcohols using at least one oxidizing agent selected from the group consisting of $NO_2$, $N_2O_4$, nitric acid and mixtures thereof, wherein said acid product is purified by distillation, the improvement therein comprising hydrogenating said acid product prior to distillation.

2. The improvement of claim 1 wherein the carboxylic acid product is selected from the group consisting of saturated $C_3$–$C_{30}$ aliphatic and $C_4$–$C_8$ cycloaliphatic carboxylic acids.

3. The improvement of claim 1 wherein the oxidizing agent is nitric acid.

4. The improvement of claim 1 wherein said acid product is hydrogenated at a hydrogen pressure of about 100 to about 2000 p.s.i. and a temperature in the range of about 15° C. to about 300° C. in the presence of a hydrogenation catalyst.

5. The improvement of claim 1 wherein the carboxylic acid product comprises a mixture of carboxylic acids.

6. The improvement of claim 5 wherein said mixture of carboxylic acids is defined by saturated $C_5$–$C_{10}$ aliphatic carboxylic acids.

References Cited

UNITED STATES PATENTS

| | | | |
|---|---|---|---|
| 3,705,921 | 12/1972 | Strickrodt et al. | 260—531 R |
| 2,791,598 | 5/1957 | Brown, Jr. et al. | 260—533 X |
| 2,824,142 | 2/1958 | Gardner et al. | 260—533 RX |

FOREIGN PATENTS

| | | | |
|---|---|---|---|
| 559,599 | 7/1958 | Canada | 260—531 R |

ELBERT L. ROBERTS, Primary Examiner

E. G. LOVE, Assistant Examiner

U.S. Cl. X.R.

260—413, 514, 531 R, 533 R, 540